Figure 1:
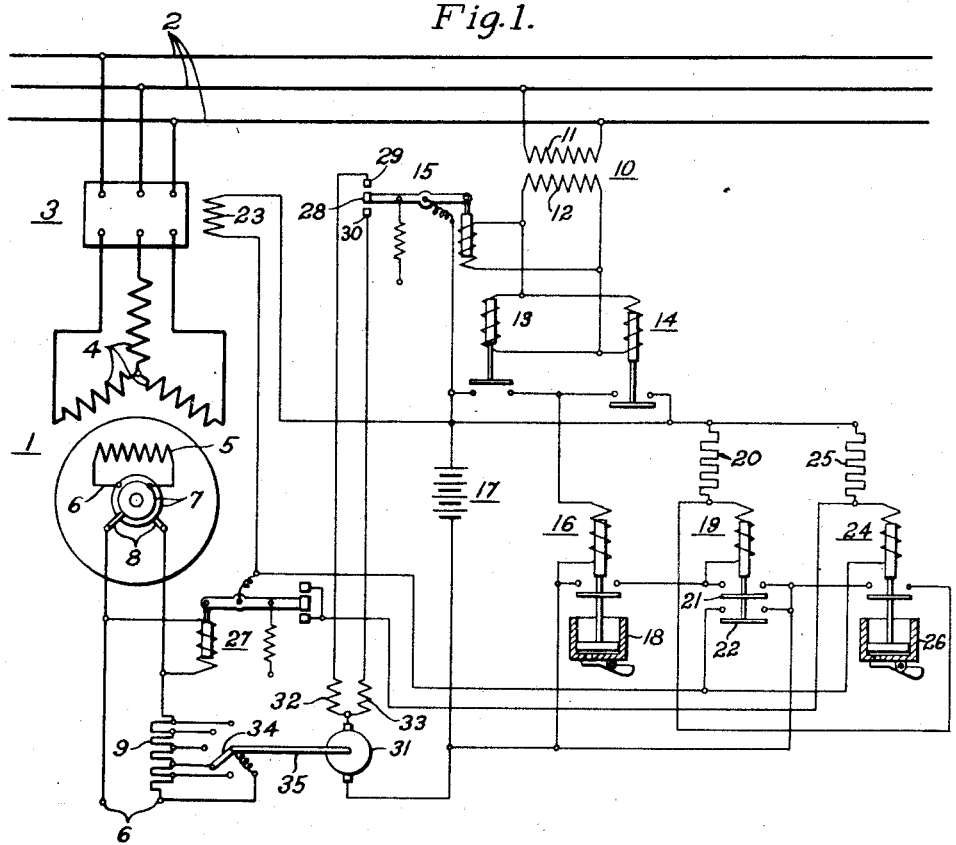

June 17, 1930.          C. C. LEVY                1,764,326
                     AUTOMATIC STATION
                    Filed April 2, 1927

WITNESSES:                                    INVENTOR
                                            Cyril C. Levy.
                                                BY
                                                   ATTORNEY Patented June 17, 1930

1,764,326

UNITED STATES PATENT OFFICE

CYRIL C. LEVY, OF PITTSBURGH, PENNSYLVANIA, ASSIGNOR TO WESTINGHOUSE ELECTRIC & MANUFACTURING COMPANY, A CORPORATION OF PENNSYLVANIA

AUTOMATIC STATION

Application filed April 2, 1927. Serial No. 180,395.

My invention relates to automatic stations and more particularly to automatically controlled stations wherein machines, commonly known as "synchronous condensers," are provided for the purpose of controlling certain electrical characteristics of transmission lines.

It is well known that the voltage and power factor of an alternating-current transmission line may be controlled by varying the excitation of a synchronous motor connected thereto. When the excitation of such a machine, which is commonly known as a "synchronous condenser," is above its normal value, the machine is traversed by current having an advanced phase angular position with respect to the voltage of the transmission line. Thus, if the total load on the transmission line has an effective power factor of less than unity, by reason of the fact that the current traversing the line is lagging behind the voltage of the line, the effect of the leading current traversing the synchronous condenser will be to increase the power factor of the transmission line. Conversely, a low power factor caused by leading current traversing the transmission line may be compensated for by exciting the synchronous condenser below the normal value of excitation to cause the machine to be traversed by lagging currents.

The voltage of a transmission line, at a point remote from the point of generation or voltage control, may be varied by varying the power factor of the line at the remote point. For the purpose of accomplishing such voltage regulation, my invention contemplates the provision of a synchronous condenser and completely automatic control equipment therefor, whereby the synchronous condenser is connected to the transmission line in response to variations in the voltage of the transmission line. When the synchronous condenser is so connected to the transmission line, it operates, under the influence of the automatic control equipment, to maintain the voltage of the transmission line substantially at a predetermined value. When the excitation of the synchronous condenser has remained substantially at its normal value for a predetermined interval of time, it is apparent that the voltage of the transmission line has remained substantially constant at its normal value for such interval of time without being influenced by the synchronous condenser. The existence of this condition indicates that the synchronous condenser may be disconnected from the transmission line without affecting the voltage thereof. Accordingly, my invention comprises means responsive to the degree of excitation of a synchronous condenser for controlling the disconnection thereof from the transmission line.

Figure 2:
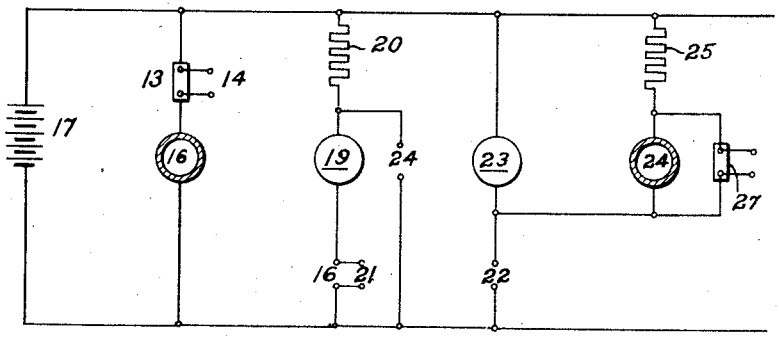

Further objects and advantages of my invention will appear in the following specification, taken in connection with the accompanying drawings, in which;

Fig. 1 is a diagrammatic respresentation of the power and control circuits of an electrical system embodying my invention, and Fig. 2 is a schematic representation of the control circuits shown in Fig. 1.

Referring to the drawings, a synchronous condenser 1 is adapted to be connected to an alternating-current transmission line 2 through a circuit interrupter 3. The synchronous condenser 1 comprises a plurality of stationary armature windings 4 and a rotatable field-magnet winding 5. The field-magnet winding 5 is connected to a pair of direct-current terminals 6 through slip-rings 7, brushes 8 and a variable resistor 9. The terminals 6 may be supplied with direct-current energy from any suitable source.

An auxiliary transformer 10 is provided with a primary winding 11 that is connected to one phase of the transmission line 2. If desired, this transformer may be provided with polyphase windings instead of single-phase windings, but, for the purpose of illustrating my invention, the showing of a single-phase winding is sufficient. The transformer 10 is provided with a secondary winding 12, to which are connected, in parallel relation, the operating windings of an under-voltage relay 13, an over-voltage relay 14 and a voltage regulator 15.

The under-voltage relay 13 is provided with a switch that is closed when the voltage applied to the winding of this relay is below a predetermined value, and the over-voltage relay 14 is provided with a switch that is closed when the voltage applied to the winding of this relay is above a predetermined value. The switches of the relays 13 and 14 are connected in parallel relation to each other, and the closure of either of them effects connection of the operating winding of a relay 16 between terminals of a source of control energy, such as a battery 17.

The relay 16 is provided with a dash-pot 18 that is adapted to retard the operation of the relay when the operating winding thereof is energized, but not to retard the operation of the relay when the operating winding thereof is deenergized. Thus, the single switch of this relay is adapted to be closed when the operating winding of the relay has been energized continuously for a predetermined interval of time. The switch of the relay 16, when closed, connects the operating winding of a relay 19 between the terminals of the control battery 17, in series with a resistor 20.

The relay 19 is provided with two switches 21 and 22, both of which are adapted to be closed when the operating winding of this relay is energized. The switch 21 is connected in parallel relation to the switch of the relay 16 for the purpose of maintaining energization of the operating winding of the relay 19 after the operating winding of the relay 16 has been deenergized to permit the switch of this relay to open.

The switch 22 of the relay 19 is adapted to connect a closing coil 23 of the circuit-interrupter 3 between the terminals of the control battery 17. The operating winding of a relay 24 and a resistor 25 that is connected in series therewith are connected in parallel relation to the closing coil 23. The relay 24 is provided with a dash-pot 26, similar to the dash-pot 18 of the relay 16, for the purpose of retarding the operation of the relay when the operating winding thereof is energized and permitting unretarded operation of the relay when the operating winding is deenergized. The single switch of the relay 24 is adapted, when closed, to short-circuit the operating winding of the relay 19, thereby deenergizing this winding to permit the switches 21 and 22 to return to their open positions.

A voltage-responsive relay 27 is provided with an operating winding that is connected in parallel relation to the terminals of the field-magnet winding 5 of the synchronous condenser 1 through the slip-rings 7 and the brushes 8. The relay 27 is also provided with contact members that are adapted to be engaged whenever the voltage applied to the operating winding of the relay is either above or below a predetermined value. These contact members, when engaged, short-circuit the operating winding of the relay 24 to permit this relay to return to its deenergized position. Thus, it will be seen that the energizing circuit for the operating winding of the relay 24 is closed whenever the switch 22 of the relay 19 is closed, but that this operating winding is short-circuited whenever the excitation voltage of the synchronous condenser 1 is either above or below a predetermined value.

The voltage regulator 15 is provided with a movable contact member 28 that is adapted to be actuated in accordance with the voltage applied to the operating winding of the regulator. When the voltage applied to this winding exceeds a predetermined value, the contact member 28 is actuated upwardly to engage a fixed contact member 29, and, when this voltage is below a predetermined value, the contact member 28 is actuated downwardly to engage a fixed contact member 30. A reversible motor 31 is adapted to be energized from the control battery 17 through a field-magnet winding 32 when the contact members 28 and 29 of the voltage regulator 15 are engaged, and through a field-magnet winding 33 when the contact members 28 and 30 are engaged.

A contact arm 34 is adapted to be actuated by the motor 31 through a shaft 35 to vary the effectiveness of the resistor 9. When the motor 31 is energized through its field-magnet winding 32, the contact arm 34 is actuated to increase the effective resistance of the resistor 9. Conversely, when the motor 31 is energized through its field-magnet winding 33, the contact arm 34 is actuated to decrease the effective resistance of the resistor 9. Thus, the degree of excitation of the synchronous condenser 1 is decreased by increasing the effectiveness of the resistor 9 when the voltage of the transmission line 2 is above a predetermined value, and the degree of excitation is increased by decreasing the effectiveness of the resistor 9 when the voltage of the transmission line 2 is below a predetermined value.

The operation of the synchronous condenser 1 is initiated automatically whenever the voltage of the transmission line 2 remains either below one predetermined value or above another predetermined value for a predetermined interval of time. This result is accomplished by the relays 13, 14, 16 and 19 and the circuit interrupter 3.

When the voltage of the transmission line 2 remains below a predetermined value for a predetermined interval of time which is required for operation of the relay 16, the operating winding of the relay 16 is energized through the switch of the relay 13 for a sufficient interval of time to permit the switch of the relay 16 to be closed. Likewise, then the voltage of the transmission line 2 remains above a predetermined value for the interval of time required for operation of the relay 16, the switch of the relay 16 is closed. When this switch is closed in response to either low or high voltage of the transmission line 2, the operating coil of the relay 19 is energized to effect closure of the switches 21 and 22.

The switch 21 completes a holding circuit for the operating winding of the relay 19 to maintain energization of this relay until the operating winding thereof is short-circuited by reason of the closure of the switch of the relay 24.

The switch 22 of the relay 19, when closed, energizes the closing coil 23 of the circuit interrupter 3 to effect closure of this circuit interrupter to connect the armature windings 4 of the synchronous condenser 1 to the transmission line 2. The circuit interrupter 3 remains closed to maintain such connection as long as the closing coil 23 is energized and is opened to disconnect the armature windings 4 from the transmission line 2 when the coil 23 is deenergized.

When the circuit interrupter 3 is closed, operation of the synchronous condenser 1 is commenced and such operation continues under the influence of the voltage regulator 15. This regulator is operative to vary the degree of excitation of the synchronous condenser 1, through the agency of the reversible motor 31 and the variable resistor 9, in accordance with the voltage of the transmission line 2. Thus, it will be seen that the synchronous condenser 1 is operative to maintain the voltage of the transmission line substantially at a predetermined value.

As long as the degree of excitation of the synchronous condenser 1 is varied intermittently in accordance with the voltage of the transmission line 2, the contact members of the voltage-responsive relay 27 are closed intermittently. Each time that the contact members of the relay 27 are engaged in response to either abnormal or sub-normal excitation of the synchronous condenser 1, the operating winding of the relay 24 is short-circuited to permit this relay to return to its deenergized position, since the switch of the relay 24 cannot be closed until the operating winding of this relay has been energized continuously for a predetermined interval of time. This switch is closed only when the degree of excitation of the synchronous condenser 1 has remained substantially constant at a predetermined value for a predetermined interval of time. When this condition occurs, the contact members of the voltage-response relay 27 remains out of engagement for an interval of time sufficient to permit the relay 24 to close its switch.

When the switch of the relay 24 is closed, the operating winding of the relay 19 is short-circuited thereby to permit this relay to open its switches 21 and 22. The opening of the switch 22 interrupts the energizing circuit of the closing coil 23 of the circuit interrupter 3 to permit this circuit interrupter to open. The synchronous condenser 1 is thereby disconnected from the transmission line 2 and remains disconnected until the occurrence of conditions which cause the relay 16 to close its switch, as hereinbefore described.

From the foregoing description, it will be seen that I have provided a completely automatic system for controlling the operation of a synchronous condenser in accordance with conditions in an alternating-current transmission line to which the condenser is adapted to be connected. The condenser is automatically connected to the transmission line when the voltage of the transmission line remains either below one predetermined value or above another predetermined value for a predetermined interval of time. While the synchronous condenser is connected to the transmission line, the degree of excitation thereof is automatically controlled to maintain the voltage of the transmission line at a desired predetermined value. When such conditions obtain in the transmission line that the voltage thereof remains substantially constant at the desired value for a predetermined interval of time without the aid of the synchronous condenser, it is indicated that the operation of the synchronous condenser is no longer required, and, accordingly, it is automatically disconnected from the transmission circuit in response to such conditions.

While I have shown and described only one embodiment of my invention, it will be obvious to those skilled in the art that various changes and modifications may be made in the apparatus and circuits utilized without departing from the spirit and scope of my invention, as set forth in the appended claims.

I claim as my invention:

1. In combination, an electric circuit, a translating device for controlling the voltage of the circuit, connecting means between the translating device and the circuit, a field-magnet winding for the translating device, means for energizing the field-magnet winding, and means responsive to the existence of a predetermined steady current in the field-magnet winding for a predetermined time for controlling the connecting means to disconnect the translating device from the electric circuit.

2. In combination, an electric circuit, a translating device, connecting means between the electric circuit and the translating device, a field-magnet winding for the translating device, means for energizing the field-magnet winding, means responsive to a predetermined electrical characteristic of the electric circuit for effecting actuation of the connecting means to connect the translating device to the electric circuit, and means responsive to the continuance of a predetermined degree of energization of the field-magnet winding for a predetermined interval of time for effecting actuation of the connecting means to disconnect the translating device from the electric circuit.

3. In combination, an electric circuit, a translating device, connecting means between the electric circuit and the translating device, an operating coil for the connecting means, a field-magnet winding for the translating device, a source of energy for energizing the field-magnet winding, regulating means responsive to a predetermined electrical characteristic of the electric circuit for varying the degree of energization of the field-magnet winding, means comprising a relay device for initiating energization of the operating coil of the connecting means between the electric circuit and the translating device in response to a predetermined electrical characteristic of the electric circuit, and for maintaining such energization independently of said electrical characteristic, a time-delay device adapted to render said relay device ineffective when said time-delay device has been energized continuously for a predetermined interval of time, an energizing circuit for said time-delay device controlled by said relay device, and a device responsive to the voltage applied to the field-magnet winding of the translating device for rendering said energizing circuit ineffective when said voltage is either above or below a predetermined value.

4. In combination, circuit-closing means, an electric circuit, a translating device adapted to be connected thereto by said means, a field-magnet winding for the translating device, means for energizing the field-magnet winding, means responsive to the voltage of the electric circuit for varying the effectiveness of said energizing means, and means responsive to the existence of a predetermined steady voltage across the field magnet winding for a predetermined time for controlling the operation of the circuit-closing means.

5. In combination, an electric circuit including a switch and a translating device, a field magnet winding for the translating device, means for energizing the field-magnet winding, means responsive to the voltage of the electric circuit for varying the effectiveness of said energizing means, and means responsive to the existence of a predetermined steady voltage applied to the field-magnet winding for a predetermined time for effecting the operation of the switch.

6. In combination, an electric circuit, a circuit breaker, a translating device adapted to be connected thereto by said circuit breaker, a field-magnet winding for the translating device, means for energizing the field-magnet winding, means responsive to the voltage of the electric circuit for varying the effectiveness of said energizing means, and means operative when the voltage applied to the field-magnet winding remains substantially constant at a predetermined value for a predetermined interval of time for effecting the operation of the circuit breaker.

7. In combination, an electric circuit, a switch, a translating device adapted to be connected to said circuit through said switch, a field-magnet winding for the translating device, means for energizing the field-magnet winding, means responsive to changes in voltage of the electric circuit for concurrently changing the voltage impressed upon the field winding, and means responsive to the existence of a predetermined steady voltage applied to the field-magnet winding for a predetermined time for causing the opening of said switch.

8. In combination, a switch, an electric circuit, a translating device adapted to be connected thereto by said switch, a field-magnet winding for the translating device, means for controlling the energization of the field-magnet winding, said means including means responsive to the voltage of the electric circuit for varying the field current, and means responsive to the existence of a predetermined steady current in the field-magnet winding for a predetermined time for effecting the opening of the switch.

In testimony whereof, I have hereunto subscribed my name this 30th day of March, 1927.

CYRIL C. LEVY.